US012646031B2

(12) United States Patent
Herasymova et al.

(10) Patent No.: US 12,646,031 B2
(45) Date of Patent: Jun. 2, 2026

(54) MODELS TO SUPPORT CAPACITY PLANNING IN SHIP-FROM-STORE OPERATIONS

(71) Applicant: Target Brands, Inc., Minneapolis, MN (US)

(72) Inventors: Daria Herasymova, Minneapolis, MN (US); Anna Holschuh, Minneapolis, MN (US); Chandrashekar Tallichetty, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 37 days.

(21) Appl. No.: 18/646,453

(22) Filed: Apr. 25, 2024

(65) Prior Publication Data

US 2024/0362584 A1 Oct. 31, 2024

Related U.S. Application Data

(60) Provisional application No. 63/498,194, filed on Apr. 25, 2023.

(51) Int. Cl.
*G06Q 10/087* (2023.01)
*G06Q 10/0631* (2023.01)

(52) U.S. Cl.
CPC ..... *G06Q 10/087* (2013.01); *G06Q 10/06315* (2013.01)

(58) Field of Classification Search
CPC ....................... G06Q 10/087; G06Q 10/06315
USPC .......................................................... 705/28
See application file for complete search history.

(56) References Cited

U.S. PATENT DOCUMENTS

| | | | |
|---|---|---|---|
| 11,100,462 B2 | 8/2021 | High et al. | |
| 11,227,244 B2 | 1/2022 | Grabovski et al. | |
| 2021/0158259 A1* | 5/2021 | Evans | G06Q 10/04 |
| 2024/0169300 A1* | 5/2024 | Evans | G06Q 10/06315 |
| 2024/0256910 A1* | 8/2024 | Giri | G06N 3/04 |

OTHER PUBLICATIONS

MCM Staff (MultichannelMerchant)—3 Keys for Using Stores as Distribution Hubs, Oct. 25, 2012, 6 Pages.
Twelve Questions to Ask Before Deploying Ship from Store —FORTNA, 2020, 9 Pages.
Order fulfillment policies for ship-from-store implementation in omni-channel retailing—ScienceDirect, Nov. 1, 2021, vol. 294, Issue 3, 12 Pages.
Patel, Aditya, 5 Factors Retailers Should Consider Before Launching Ship From Store, Oct. 17, 2022, 12 Pages.

* cited by examiner

*Primary Examiner* — Russell S Glass
(74) *Attorney, Agent, or Firm* — Merchant & Gould, P.C.

(57) ABSTRACT

Methods and systems for optimizing a ship-from-shore process are provided. A decision model receives forecasted demand and node data representing a plurality of possible shipping node configurations. The decision model generates output data that includes an assignment of the forecasted demand to nodes among the plurality of nodes based on the shipping cost data and the node data while optimizing a supply chain objective subject to a plurality of constraints, the plurality of constraints including a fulfillment of the forecasted demand within a predetermined delivery service level, and identifies an optimal configuration for each shipping node. In some aspects, the decision model segments the node data to improve efficiency of analysis.

20 Claims, 9 Drawing Sheets

306

| Store ID | Current Pack Stations | Pack Stations | Store Lat. | Store Long. | Maximum Throughput | Demand Region | Required Packing Stations | Packing Station Cost |
|----------|----------------------|---------------|------------|-------------|--------------------|---------------|---------------------------|----------------------|
| 111 | 4 | 3 | 45 | -90 | 149 | NY | 0 | 0 |
| 111 | 4 | 4 | 45 | -90 | 250 | NY | 0 | 0 |
| 111 | 4 | 5 | 45 | -90 | 350 | NY | 0 | 100 |
| 222 | 4 | 4 | 39 | -82 | 250 | NY | 0 | 0 |
| 222 | 4 | 5 | 39 | -82 | 355 | NY | 0 | 100 |
| 333 | 3 | 3 | 34 | -83 | 160 | NY | 0 | 0 |
| 333 | 3 | 4 | 34 | -83 | 204 | NY | 0 | 100 |
| 333 | 3 | 5 | 34 | -83 | 265 | NY | 0 | 200 |
| 333 | 3 | 6 | 34 | -83 | 302 | NY | 0 | 250 |
| 646 | 3 | 3 | 34 | -87 | 266 | US | 0 | 0 |
| 681 | 4 | 4 | 45 | -93 | 285 | US | 0 | 0 |
| 744 | 3 | 3 | 44 | -92 | 266 | US | 0 | 0 |
| 751 | 4 | 4 | 41 | -85 | 241 | US | 0 | 0 |
| 752 | 6 | 6 | 42 | -120 | 286 | US | 0 | 0 |
| 800 | 4 | 4 | 45 | -119 | 174 | US | 0 | 0 |
| 817 | 3 | 3 | 37 | -97 | 33 | US | 0 | 0 |
| 824 | 3 | 3 | 40 | -77 | 195 | US | 0 | 0 |
| 830 | 4 | 4 | 42 | -88 | 164 | US | 0 | 0 |
| 943 | 6 | 6 | 37 | -75 | 109 | US | 0 | 0 |
| 949 | 4 | 4 | 40 | -90 | 299 | US | 0 | 0 |
| 955 | 3 | 3 | 33 | -95 | 217 | US | 0 | 0 |
| 1072 | 6 | 6 | 28 | -96 | 197 | US | 0 | 0 |

NODE DATA

FIG. 4

| Demand Location | Latitude | Longitude | Demand |
|---|---|---|---|
| 12205 | 42.1 | -76.1 | 170 |
| 13760 | 42.9 | -74.1 | 165 |
| 12309 | 43.9 | -73.9 | 174 |
| 12019 | 42.8 | -76.1 | 178 |
| 12085 | 42.6 | -75.1 | 314 |
| 12180 | 42.9 | -76.3 | 367 |
| 12189 | 42.7 | -76.2 | 322 |
| 12203 | 43.1 | -73.9 | 181 |
| 12204 | 42.9 | -73.8 | 182 |
| 12302 | 43.9 | -73.8 | 345 |
| 12306 | 42.2 | -73.9 | 198 |
| 12307 | 42.4 | -75.1 | 189 |
| 12308 | 43.5 | -74.2 | 245 |
| 13762 | 42.6 | -74.1 | 233 |

FORECASTED DEMAND DATA

308

| Store ID | Pack Stations | Store Capacity | DDUs | MinDistance | MaxDistance | MeanDistance | TotalDemand |
|---|---|---|---|---|---|---|---|
| 111 | 4 | 149 | 6 | 55.63 | 123.6 | 76.2 | 148 |
| 222 | 5 | 250 | 5 | 12.4 | 223.6 | 86.2 | 245.6 |
| 333 | 4 | 350 | 11 | 23.4 | 433.2 | 123.6 | 346.3 |
| 646 | 3 | 266 | 14 | 23.1 | 443.2 | 224.1 | 244.2 |
| 681 | 4 | 285 | 8 | 24.5 | 234.2 | 124.8 | 278.2 |
| 744 | 3 | 266 | 9 | 34.5 | 123.5 | 56.7 | 245.4 |
| 751 | 4 | 241 | 4 | 36.1 | 443.1 | 125.9 | 221.9 |
| 752 | 6 | 286 | 15 | 25.1 | 225.7 | 146.3 | 278.5 |
| 800 | 4 | 174 | 1 | 32.7 | 174 | 87.2 | 167.1 |
| 817 | 3 | 33 | 4 | 23.6 | 143.2 | 67.9 | 23.5 |
| 824 | 3 | 195 | 7 | 75.3 | 167.4 | 99.3 | 191.1 |
| 830 | 4 | 164 | 5 | 89.6 | 164 | 102.1 | 156.7 |
| 943 | 6 | 109 | 7 | 46.8 | 187.2 | 123.4 | 108.1 |
| 949 | 4 | 299 | 4 | 22.4 | 99.0 | 66.2 | 284.2 |
| 955 | 3 | 217 | 8 | 25.6 | 236.3 | 86.4 | 210.2 |
| 1072 | 6 | 197 | 8 | 28.7 | 197 | 88.9 | 195.2 |

OPTIMIZED CONFIGURATION

| Receive demand data and node data at decision model | 702 |
| Segment demand data and node data at decision model. | 704 |
| Assign forecasted demand to one or more nodes | 707 |
| Generate an optimal configuration for one or more nodes | 708 |

MODELS TO SUPPORT CAPACITY PLANNING IN SHIP-FROM-STORE OPERATIONS

CROSS-REFERENCE TO RELATED APPLICATIONS

The present application claims priority to U.S. Provisional Patent Application No. 63/498,194, filed on Apr. 25, 2023, the disclosure of which is hereby incorporated by reference in its entirety.

BACKGROUND

A supply chain may include various nodes, such as stores, warehouses, and the like. These nodes may be configured for different purposes. For example, some nodes, such as store locations, may operate as retail locations and sell items directly to customers, and also serve as places from which items are shipped. There may be various ways in which a node may be configured, and the way in which a node is configured may affect overall supply chain operations, resulting in effects to costs, shipping times, demand allocation, item availability, or other metrics. In some instances, it may be challenging to determine an optimal node configuration or to determine an optimal flow of items through a supply chain. That is, some nodes, such as retail locations, may experience high demand for shipments to customers, but may be configured without adequate equipment to fulfill that demand in an efficient or timely manner. Node reconfiguration can be costly, and may involve a tradeoff of shipment handling and retail operations within a finite space. A further complication is that, by changing a configuration of a first node, an optimal configuration of other nodes in the supply chain may be affected. As a result, there may be a vast number of permutations of node configurations. In large supply chains, computation of all possible configurations of nodes to achieve a particular optimized configuration may be computationally complex, and unwieldy.

SUMMARY

Aspects of the present disclosure relate to a method and system for determining an optimal configuration of supply chain nodes. In examples, the system considers forecasted demand, an available budget, and a cost required for a node to operate with a certain capacity. Furthermore, the system may optimize a metric, such as minimizing one or more of a distance, shipping cost, or capacity installation cost. The system uses a set of data files defining an abstraction of demand, as well as configured, discrete possible configurations for supply chain nodes to constrain the problem space for optimization. In some instances, a segmentation process is performed to further reduce the number of calculations performed as part of the optimization process.

In a first example aspect, a method for optimizing a ship-from-store process at a decision model is implemented on a computing system, and includes: receiving, at the computing system, first data including a forecasted demand for each of a plurality of regions; receiving, at the computing system, second data including node data, the node data including, for each node of a plurality of nodes: a location, a throughput configuration, and one or more constraint values; receiving, at the computing system, shipping cost data, the shipping cost data including a shipping cost associated with delivery of the forecasted demand from one or more of the plurality of nodes; and providing the first data, the second data, and the shipping cost data to the decision model, the decision model being configured to generate output data including an assignment of the forecasted demand to nodes among the plurality of nodes based on the shipping cost data and the node data while optimizing a supply chain objective subject to a plurality of constraints, the plurality of constraints including a fulfillment of the forecasted demand within a predetermined delivery service level; wherein the output data defines an optimal configuration for each node of the plurality of nodes, the optimal configuration including an optimized throughput value.

In a second example aspect, a system for automatically determining ship-from-store equipment configurations in a distributed enterprise supply chain includes: a computing system comprising a processor and a memory, the memory storing instructions which, when executed by the computing system, cause the system to perform: receiving first data from a first data source including a forecasted demand for each of a plurality of regions; receiving second data from a second data source, the second data source including node data, the node data including, for each node of a plurality of nodes: a location, a throughput configuration, and one or more constraint values; receiving shipping cost data from a shipping cost management system, the shipping cost data including a shipping cost associated with delivery of the forecasted demand from one or more of the plurality of nodes; and providing the first data, the second data, and the shipping cost data to the decision model, the decision model being configured to generate output data including an assignment of the forecasted demand to nodes among the plurality of nodes based on the shipping cost data and the node data while optimizing a supply chain objective subject to a plurality of constraints, the plurality of constraints including a fulfillment of the forecasted demand within a predetermined delivery service level; wherein the output data defines an optimal configuration for each node of the plurality of nodes, the optimal configuration including an optimized throughput value.

In a third example aspect, a method of optimizing a ship-from-store process at a decision model implemented on a computing system is disclosed. The method includes receiving, at the computing system, first data including a forecasted demand for each of a plurality of regions. The method further includes receiving, at the computing system, second data including node data, the node data including, for each node of a plurality of nodes: a location, a throughput configuration, and one or more constraint values, the node data including a plurality of entries representing a possible configuration of a shipping node within an enterprise supply chain, the throughput configuration defining handling equipment to be configured at the shipping node. The method also includes receiving, at the computing system, shipping cost data, the shipping cost data including a shipping cost associated with delivery of the forecasted demand from one or more of the plurality of nodes to the plurality of regions, and segmenting the node data into a plurality of geographical segments. The method includes providing the first data, the second data, and the shipping cost data to the decision model, the decision model being configured to, for each segment of the plurality of geographical segments, generate output data including an assignment of the forecasted demand to nodes among the plurality of nodes based on the shipping cost data and the node data while optimizing a supply chain objective subject to a plurality of constraints, the plurality of constraints including a fulfillment of the forecasted demand within a predetermined delivery service level. The output data defines an optimal configuration for each node of the plurality of nodes across the plurality of geographical segments, the optimal configuration including an optimized throughput value.

BRIEF DESCRIPTION OF THE DRAWINGS

FIG. 4 illustrates example node data for each node of a plurality of nodes.

FIG. 6 illustrates an example optimized configuration generated using the systems described herein.

DETAILED DESCRIPTION

Figure 1A:
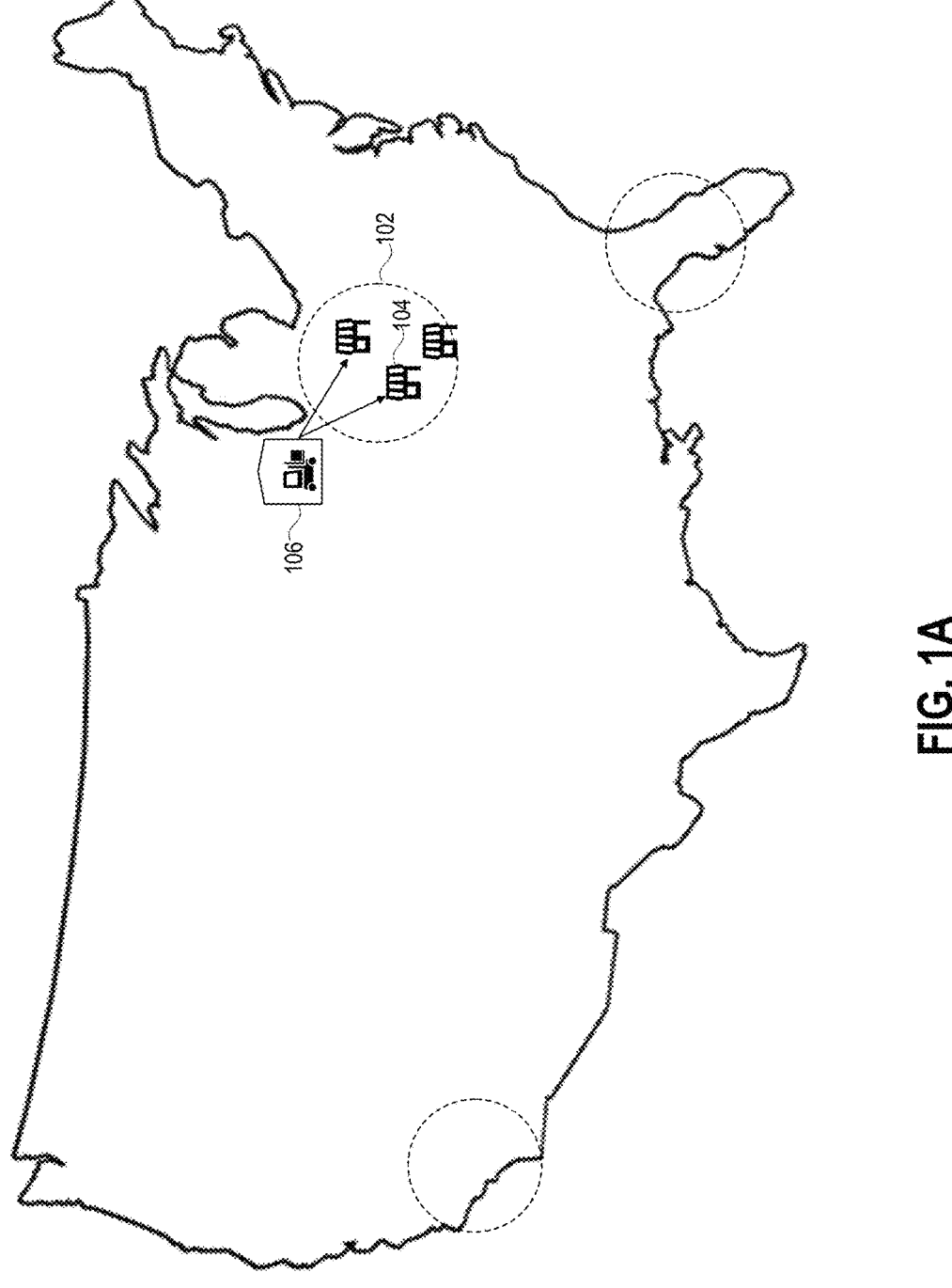
FIG. 1A illustrates an example distributed enterprise supply chain including a plurality of regions.

As briefly described above, aspects of the present disclosure relate to a system for optimizing aspects of a supply chain. As one example, the system may determine an optimal configuration of nodes within the supply chain. As another example, the system may determine an optimal flow of items through the supply chain (e.g., determining a placement of items at nodes in the supply chain). In some embodiments, supply chain nodes may include stores. However, the supply chain nodes are not limited to stores and may, in some embodiments, be sortation centers, warehouses, third-party facilities, or other locations.

In some embodiments, the system may receive input related to a supply chain. Such input may include the following: demand data, distance data, cost data, and store data. In some embodiments, the data may correspond to an existing supply chain. Alternatively, the input data may, in some embodiments, be based at least in part on a hypothetical supply chain. In some embodiments, the demand data may be forecasted demand that is generated at least in part on historical demand data. In some embodiments, the store data may include infrastructure or equipment that is available at a store. For example, the store data may indicate that a store has—or does not have—capacity to perform an operation related to shipping a product, such as packing items, picking items, storing items, or transporting items.

In some embodiments, the system may seek to optimize a metric based on the input data. For instance, the system may seek to minimize a sum of distances (e.g., a sum of distances between node locations), a shipping cost, an equipment or capital cost, or a combination of costs and distances. In other embodiments, however, the system may seek to maximize or minimize other metrics or combinations of metrics that may relate to supply chain performance.

Based on the optimization, the system may, in some embodiments, output an optimal configuration of one or more nodes. Additionally, the system may output an optimal demand allocation. In some embodiments, these optimal configurations and/or the demand allocation may satisfy a forecasted market demand while minimizing a shipping expense, shipping distance, or other metric. In some embodiments, the system may also account for a cost required to alter a node configuration and resources that are available to effectuate a configuration.

In some embodiments, the system may execute various (e.g., thousands) of scenarios that correspond to permutations of different scenarios. For example, the system may execute a scenario in which one or more aspects of the input data is altered. For instance, the system may execute a scenario in which a first store has a higher throughput (e.g., has more packing stations, labor, etc.), whereas a second store has lower throughput. As another example, the system may alter demand at one or more locations, or the system may alter a way in which demand is allocated across supply chain nodes. For each scenario, the system may seek to optimize a metric, as described above. In some embodiments, the scenario parameters may alter an optimal node configuration or demand allocation. By comparing the results of scenarios, an entity may compare tradeoffs that may be caused by different circumstances that may arise.

In some embodiments, the system may distribute computations of different scenarios across various computational nodes (e.g., computing systems) of a cluster. In some embodiments, the system may embed an optimization model (also referred to herein as decision model) within a Spark job and run it on a Hadoop cluster. Scenarios may then be run on individual nodes in a cluster, allowing for parallelism and faster computation times. In other embodiments, the system may distribute the computation of scenarios using other technology (e.g., a high-performance computer cluster or another computing cluster).

In addition, in some embodiments, the system may distribute computations of segmented portions of a scenario to different computational nodes. Segmented portions of a scenario may include information regarding a set of supply chain nodes and a set of locations and related demand that is in geographic proximity to the supply chain nodes. Such an arrangement may avoid having to compute distances between supply chain nodes and delivery locations that are unlikely to be selected, thereby reducing overall computational complexity while allocating smaller problem sets to individual computing nodes in parallel, thereby speeding execution of the system while reducing the scale and complexity of the optimization processes performed.

Advantageously, aspects of the present disclosure include a system that may, in some embodiments, optimize aspects of a supply chain using different combinations of objective and constraints. As part of performing an optimization, the system may, in some embodiments, determine an optimal throughput of a node that is a store, accounting for a cost required to enable the optimal level of throughput. Yet still, the system may execute hypothetical scenarios and generate an optimal demand allocation or node configuration based on tradeoffs that may be illustrated by the results of hypothetical scenarios.

These and other examples will be explained in more detail below with respect to FIG. 1A-FIG. 8.

FIG. 1A illustrates an example distributed enterprise supply chain including a plurality of regions. Supply chain 100 may a plurality of nodes 104 within a plurality of regions 102 may be served by one or more warehouses 106. In this context, nodes 104 may correspond to supply chain nodes, and may include retail store locations from which shipments to customers may be sent (e.g., in a ship-from-store configuration).

In some examples, node(s) 104 may be geographically closer to customers in one or more regions 102 than warehouse(s) 106. This proximity causes node(s) 104 to be a more efficient fulfillment center for order requests originating within the region(s) 102 than warehouse(s) 106. This efficiency may be due to lower shipping costs due shorter shipping distances, access to a greater variety of shipping carriers, faster shipping costs, or other factors. In some embodiments, shipping carriers may include commercial shipping companies, delivery associates of the retail enterprise, or gig delivery drivers such as app-based delivery drivers, or other contract delivery drivers.

Figure 1B:
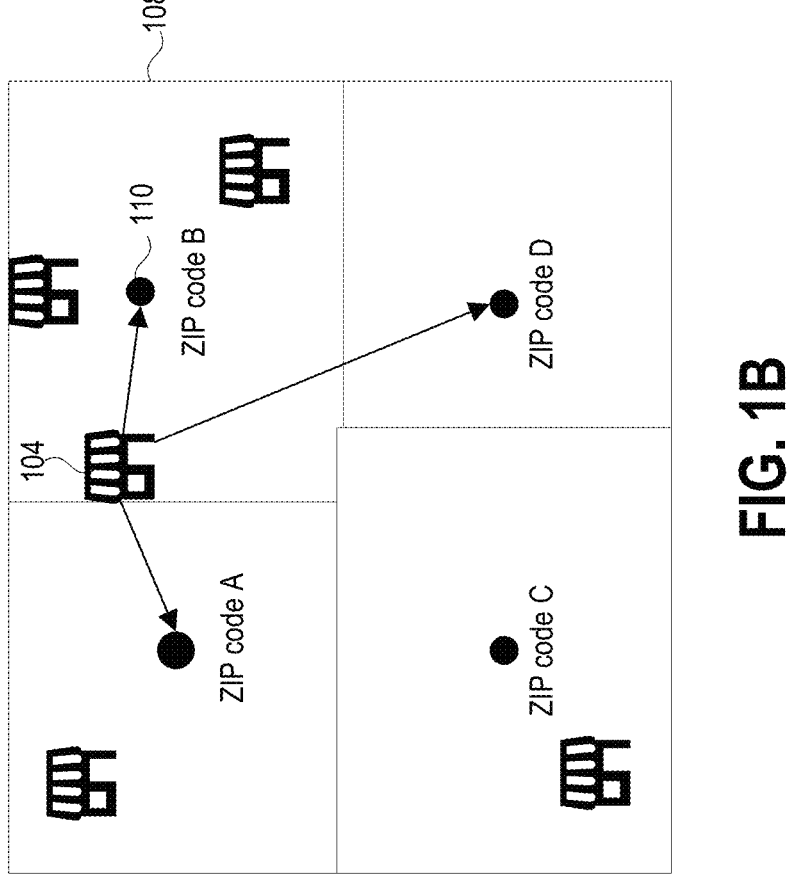
FIG. 1B illustrates an example region within a distributed enterprise supply chain including a plurality of nodes.

FIG. 1B illustrates an example region within a distributed enterprise supply chain including a plurality of nodes. Region 102 may include node(s) 104, ZIP code(s) 108, and ZIP code centroid(s) 110.

In some examples, ZIP code(s) 108 may each be assigned with a representative location corresponding to the centroid 110 of the ZIP code 108.

In some examples, a ZIP code centroid 110 may be assigned as the geographical center of a ZIP code 108. In other embodiments, a ZIP code centroid 110 may be assigned based on a population distribution within a ZIP code 108, a demand distribution within ZIP code 108, or other factors.

In some examples, node(s) 104 may each be assigned to a ZIP code 108. In some embodiments, node(s) 104 may correspond to a location within a ZIP code 108. A location within a ZIP code 108 may be defined by geographical coordinates or distance from the centroid 110 of the ZIP code 108. One or more node(s) 104 may be assigned as a ship-from-store fulfillment center for order requests originating from one or more ZIP code(s) 108. A node 104 may be assigned as a ship-from-store fulfillment center for one or more ZIP code(s) 108 based on a maximum distance from node 104 to a ZIP code centroid 110, availability of other node(s) 104 to fulfill orders to a ZIP code 108, demand associated with a ZIP code 108, or other factors.

In accordance with the present disclosure, the demand assigned to a ZIP code 108 may be assigned for purposes of determining demand to be fulfilled to that ZIP code from any available node. The demand may be determined as demand in online orders to delivery addresses having that ZIP code within a particular time period. The time period may be configurable (e.g., weekly, monthly, annually, or the like).

Figure 2:
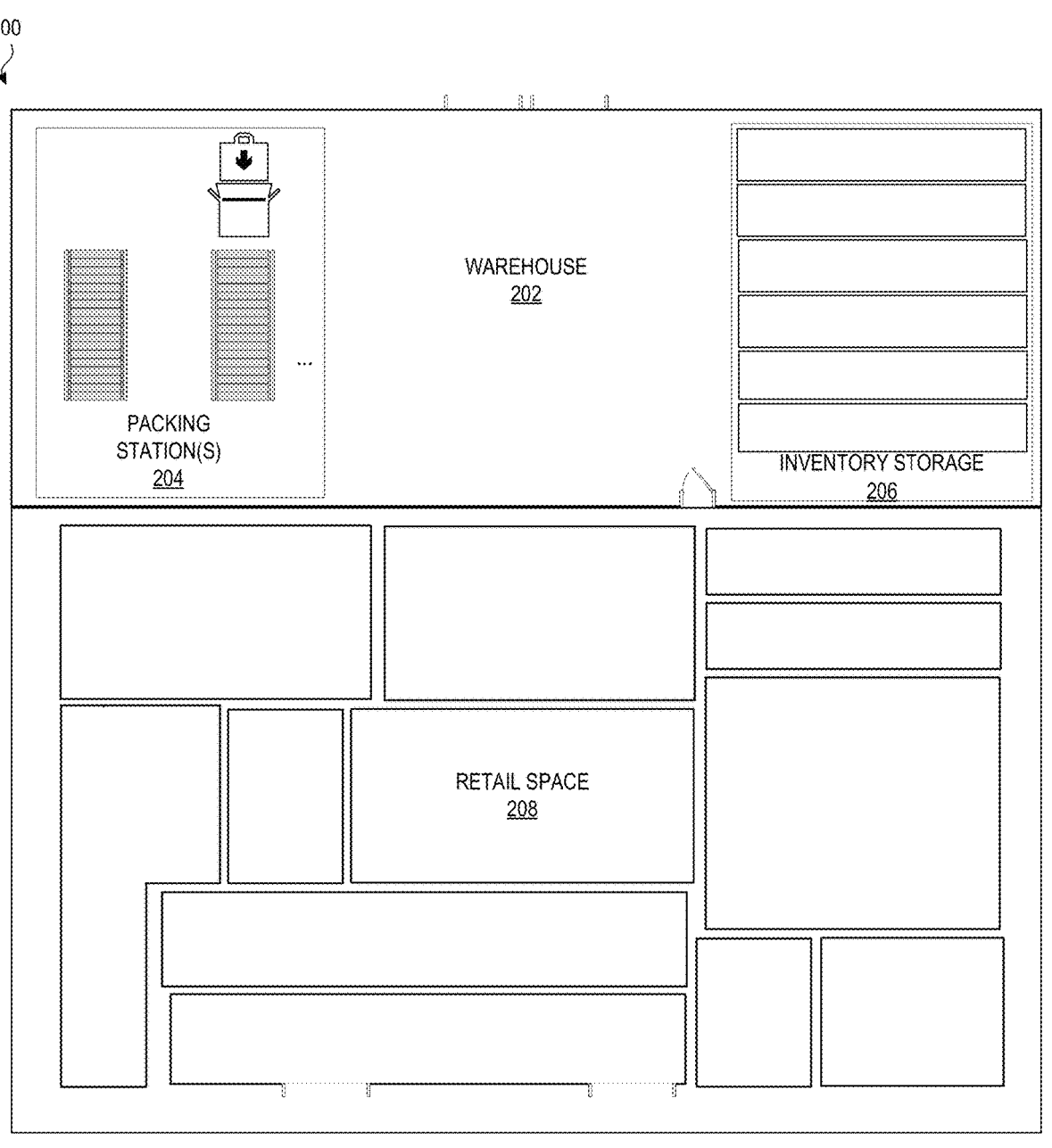
FIG. 2 illustrates an example store layout including packing station area and inventory storage area.

FIG. 2 illustrates an example store layout including packing station area and inventory storage area. Store layout 200 may include warehouse 202, packing station(s) 204, inventory storage 206, and retail space 208.

In some examples, warehouse 202 may take up a certain amount of floor space within store layout 200. In some embodiments, warehouse 202 may be separate from retail space 208. In some examples, warehouse 202 may include available space for packing station(s) 204 or inventory storage 206.

In some examples, packing station(s) 204 may include: space for storing packing materials; packing equipment; space for preparing inventory for shipment; space for packing inventory; a package dispatch area; and space for conveying packages to a dispatch area. Packing station 204 configuration may vary based on the type of inventory available as ship-from-store inventory at a given retail store, the type or amount of automation equipment at a given retail store, or the type or amount of labor at a given retail store. For example, labor at a given retail store may include general employees, trained ship-form-store employees, or robots.

In some examples, inventory storage 206 may take up a certain amount of floor space within warehouse 202 and may hold a particular amount of inventory. In some embodiments, inventory storage 206 for a given store may hold a particular assortment of inventory based on capacity. For example, inventory storage 206 may have capacity for storing bulky items. In some examples, inventory may be designated as retail inventory, ship-from-store inventory, or may be available for sale as both.

In some examples, retail space 208 may include space for multiple departments such as clothing, home, grocery, electronics, office, entertainment, toys, sports, outdoors, health, beauty, personal care, pets, store checkout, store pick-up, guest services, dining space, and other departments. Each department may take up a certain amount of floor space and may hold a particular amount or assortment of inventory. In some embodiments, ship-from-store inventory may be held within retail space 208, picked by enterprise employees, and brought to packing station(s) 204 for ship-from-store order processing.

In examples, the store layout 200 may be configurable in accordance with one or more feasible layouts based on the amount of feasible inventory storage 206 and packing stations 204 that may be supported by the footprint of that store. For example, a particular store may have a nearly constant among of retail space, and the space allocated in a "back room" may be allocated to inventory storage and/or packing stations. An amount of inventory storage may be defined to be sufficient to maintain adequate inventory to support retail operations of the store (e.g., for restocking shelves in the retail space 208) and also to support ship from store operations. The number of packing stations (and related equipment, space for workers, and the like) may be selected to support ship from store operations. Because of the finite amount of backroom space available, and because of the store needs for staffing and supporting ship from store operations, in some instances a number of packing stations and other ship from store locations may be limited to a discrete number of such packing stations.

Figure 3:
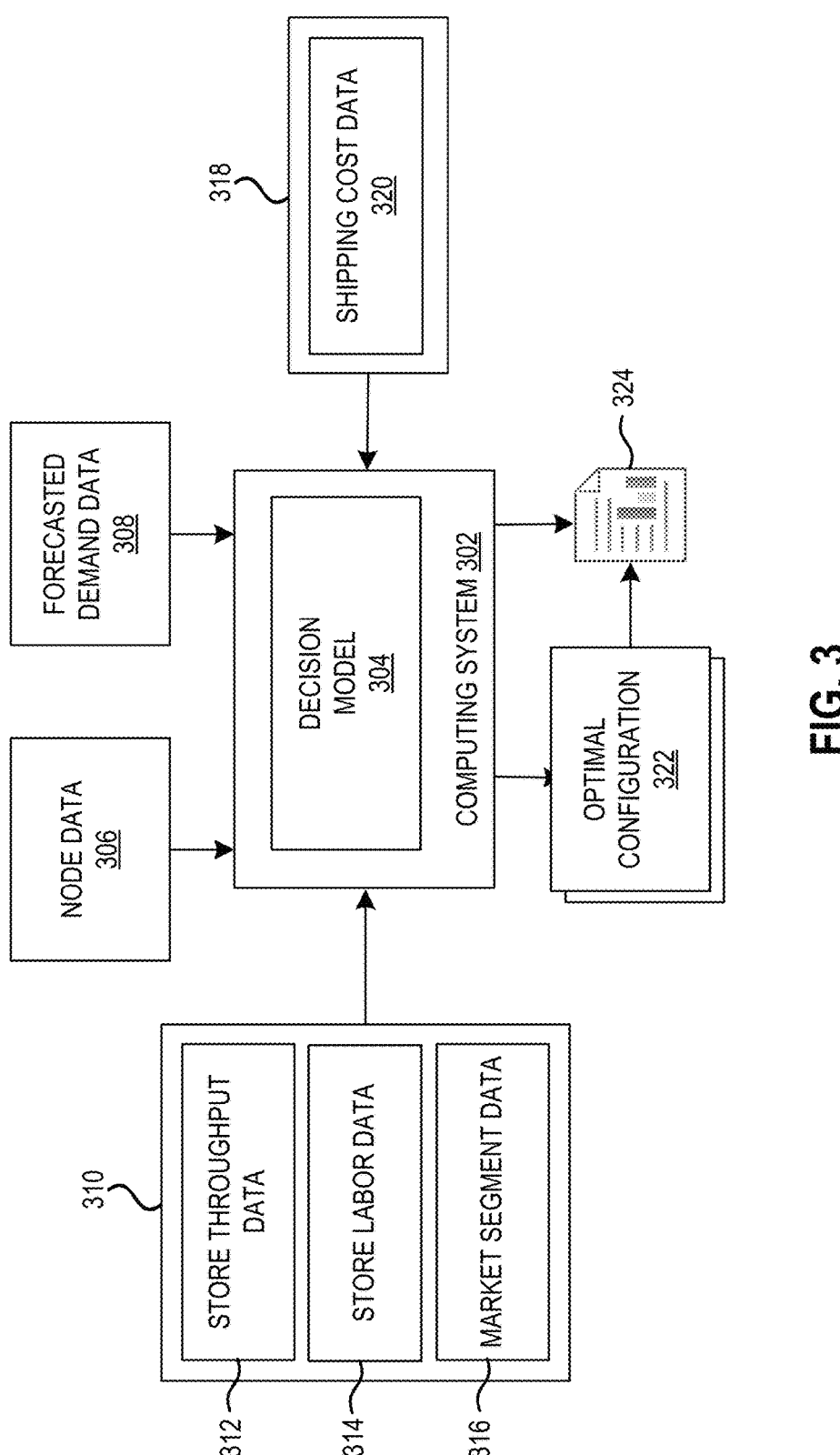
FIG. 3 illustrates an example system for determining ship-from-store equipment configurations in a distributed enterprise supply chain.

FIG. 3 illustrates an example system 300 for determining ship-from-store equipment configurations in a distributed enterprise supply chain. As will be described in more detail below, the system 300 may include a computing system 302, decision model 304, node data 306, forecasted demand data 308, data sources internal to the enterprise 310, store throughput data 312, store labor data 314, market segment area 316, data sources external to the enterprise 318, shipping cost data 320, and optimal configuration 322.

In some examples example, computing system 302 is configured to receive input data from one or more internal sources 310 or external sources 318 and provide data to decision model 304. Computing system 302 may be a may be a desktop computer, a laptop computer, a tablet, a cell phone, a smart TV, a smart wearable device, or other appropriate electronic device which is capable of storing and executing instructions that cause the system to receive data and provide data to the decision model. An example of such a computing system is described below in conjunction with FIG. 8. In some instances, the computing system 302 may be a cloud or virtualized computing system, or other shared computing resource, including a plurality of execution units.

In some examples, the computing system 302 may be capable of executing segmented portions of an optimization process, for example, in parallel with each other, e.g., using a plurality of execution units as described above. In some examples, segmented portions of the optimization process may correspond to regions 102 of an overall geographical area, such that a region 102 may have a plurality of nodes 104 that are eligible ship from store locations, each of which being a candidate to ship to at least some of the ZIP codes associated with that geographical area. The region may be defined by a subset of the overall set of nodes that are included within or service that region and all data associated with that node, as well as ZIP code and demand data associated therewith. That is, overall input data may be regionalized to segment the process and avoid circumstances where node distance calculations are made for every store relative to a particular ZIP code, even where it is highly unlikely that a particular node would ever be used to fulfill demand for that ZIP code (e.g., a node on the other side of the country from the ZIP code associated with that demand). This segmentation therefore not only parallelizes the calculation of a solution, it reduces the complexity of portions of the solution when executing the optimization process described in further detail below, thereby reducing overall computational complexity, computation expense, and execution time.

In some examples, input data may include some or all of: node data 306; forecasted demand data 308; store throughput data 312; store labor data 314; market segment data 316; and/or shipping cost data 320. Input data may be stored in one or more various databases, which may be virtual (e.g., cloud-based), network based, or drive-based. In some aspects, the input data may be provided as a data file. In some implementations, a data file may be generated by one or more computing systems by selecting and organizing data input from a plurality of internal or external sources. For example, a data file may be organized to have a standardized format to allow for efficient processing by decision model 304.

In some examples, node data 306 may include data for each node of a plurality of nodes. For example, node data 306 may include a location, a throughput configuration, and one or more constraint values for one or more nodes. In some examples, constraint values may include a packing station equipment value, a limit on number of packages able to be handled at a node, types of packages able to be handled at a node, or a limit on package size able to be handled at a node. In some embodiments, the packing station equipment value may include a current number of packing stations at a node or a packing station cost corresponding to a cost of adding one or more packing stations at a node. In some examples, shipping cost data may include shipping cost associated with delivery of the forecasted demand from one or more of nodes. In some embodiments, node data may include a plurality of entries corresponding to different configurations of numbers of packing stations at one or more nodes. In some embodiments, the node data may include a plurality of entries, each entry corresponding to a ZIP code, each entry providing an aggregated demand for the corresponding ZIP code and a location corresponding to the centroid of the ZIP code. Node data 306 is further illustrated and described with respect to FIG. 4.

In some examples, forecasted demand data 308 may include forecasted demand for one or more regions. For example, forecasted demand data 308 may be based at least in part on historical demand data. In other examples, forecasted demand data 308 may be generated based on: market benchmarks; financial data; and/or market analysis (for example, actual or predicted market trends). In some examples, the one or more regions may include one or more ZIP codes and the forecasted demand data may include aggregated demand for each ZIP code. As shown in example FIG. 3, forecasted demand data 308 may be from internal sources 310. In other embodiments, forecasted demand data 308 may be from external sources 318. Forecasted demand data 308 is further illustrated and described with respect to FIG. 5.

In some examples, store throughput data 312 may include throughput information for each node or a plurality of nodes. For example, store throughput data 312 may include: the amount of floor space of a store; the amount of warehouse space of a store, the amount of warehouse space currently used for inventory storage; the number of packing station(s) currently at a store, the amount of warehouse space currently utilized for packing station(s); the amount of warehouse space available for additional packing station(s), etc. Store throughput data may be from internal sources 310.

In some examples, store labor data 314 may include: the number of personnel at a store; the number of vacant positions for additional personnel at a store, etc. Store labor data 314 may be from internal sources 310.

In some examples, market segment area data 316 may include an assignment of one or more nodes to one or more regions. In some examples, the one or more regions may include one or more ZIP codes. The regions may be defined based on geographical location, sales data, demand data, or other factors.

In some examples, shipping cost data 320 may include: cost of packing materials; cost of shipping based on package carrier; speed of shipping based on package carrier; cost of shipping based on distance from node ZIP code to a destination ZIP code; or cost of shipping based on shipping speed. As shown in example FIG. 3, shipping cost data 320 may be from external sources 318. In other embodiments, shipping cost data 320 may be from internal sources 310.

In some examples, decision model 304 is configured to receive data from computing system 302 and generate output data including an optimal configuration 322 for one or more of a plurality of nodes according to methods herein.

In some embodiments, the decision model may incorporate a linear optimization program such as mixed-integer linear program (MILP) or an integer program. In one embodiment, the model may be constructed as:

$$minK * \sum_{z \in Z} \sum_{s \in S} \sum_{c \in C_s} p(l_{zs}) * x_{zsc}$$

Subject to the constraints:

$$\sum_{c \in C_s} y_{sc} \leq 1, \forall s \in S \qquad \text{Equation 1}$$

$$\sum_{s \in S} \sum_{c \in C_s} x_{zsc} = 1, \forall z \in Z$$

$$\sum_{s \in S} \sum_{c \in C_s} N_{sc} * y_{sc} \leq P$$

$$\sum_{z \in Z} d_z * x_{zsc} \leq S_{sc} * y_{sc}, \forall s \in S \ \forall c \in Z_S$$

The notation for the inputs of Equation 1 are defined in further Table 1:

TABLE 1

| Notation | Description |
|---|---|
| | Input data |

TABLE 1-continued

| Notation | Description |
| --- | --- |
| S | Set of all Stores |
| $s = 1, \ldots, |S|$ | Index over set of stores |
| z | Set of all possible zip codes |
| $z = 1, \ldots, |Z|$ | Index over set of zip codes |
| $C_s$ | Set of all possible configurations for a store $s \in S$ |
| $c = 1, \ldots, |C_s|$ | Index over the set of store configurations $C_s$ |
| $N_{sc}$ | Cost of SFS stations at store s with configuration c |
| $S_{sc}$ | Number of SFS order units at store s with configuration c |
| $l_{zs}$ | Distance of zip code z from store s |
| $d_z$ | Demand in number of units from zip code z for channel SFS |
| P | User input of available budget |
| K | Is a constant defined as $1/||S||$ |
| | Output data or Decision Variables (DV) |
| $y_{sc} \in [0, 1]$ | Binary DV indicating if store $s \in S$ with configuration $c \in S$ is chosen |
| $x_{zsc} \in [0, 1]$ | DV indicating if zip $z \in Z$ is assigned to store $s \in S$ with configuration $c \in C_s$ |

In the above context, Equation 1 represents the objective function for minimizing shipping distance between stores and zip codes while ensuring that the cost of the output configuration is less than or equal to an available budget. In some embodiments, other current or forecasted constraint values can also be added as constraints to the optimization problem and the model may be used predictively.

Restated, the equations above generally represent a MILP-solver useable to minimize a shipping cost and distance using decision variables (DV) x and y, in which y represents binary values of whether a store having a particular configuration is chosen to meet overall demand, and x represents binary values indicating whether a zip code is assigned to a store, across all possible stores s and store configurations c. Generally, store configurations c may correspond to a particular arrangement of a store, including at least a number of packing stations assigned to a store in that particular configuration, and optionally a cost associated with installing that number of packing stations (or that marginal additional number of packing stations) at that store.

In some examples, optimal configuration 322 defines an optimal configuration of the supply chain network across the set of nodes. In some embodiments, the optimal configuration 322 may include an optimized throughput value for each node of the plurality of nodes, which represents the amount of ship from store capacity that is to be allocated to that node. In some embodiments, the optimal configuration 322 may include, or reflect, one or more of a quantity of equipment, a type of equipment, a quantity of labor, or a type of labor for each node of the plurality of nodes. In some instances, the optimal configuration 322 may include a report of investment required to reach the optimal configuration 322. In other instances, optimal configuration 322 may be responsive to input constraints values such as an investment constraint, thus allowing for efficiencies such as predicting an optimal configuration 322 for a plurality of nodes across an enterprise that will be within a given budget. In some embodiments, optimal configuration 322 may be responsive to other constraint values according to aspects described herein.

In some examples, an optimal configuration 322 may be presented to a user. For example, a user may be an employee of a retail enterprise such as a store planning or store operations manager. A user may then use the optimal configuration 322 to make decisions for the enterprise, such as store configurations, new store opportunity assessments, market optimization, market segmentation, labor configurations, budget allocation, budget predictions, or other planning decisions. These decisions may be evaluated on a per-region basis, which may have the advantages of evaluating a region including a plurality of nodes which have shared supply chain or demand attributes and which will each benefit from the decision, thus creating an efficiency because a decision can be evaluated across all nodes in a region and not for each individual node in some examples.

In particular examples, because the optimal configuration 322 may be formatted as tabular data as reflected below, the user may be presented with a variety of predefined visualizations of that data. For example, a user may be presented with a total cost to reconfigure a supply chain to achieve the optimal configuration, based on the input data and the selected optimal configuration for numbers of packing stations at selected stores included in the optimal configuration 322. The user may also be presented with, e.g., the estimated shipping cost total for the optimal configuration, and may compare that against a current configuration, or some other stored, hypothetical configuration. In examples, a plurality of optimal configurations may be generated and stored for comparison against one another, e.g., in one or more report visualizations 324. As such, a user may readily be able to compare costs and supply chain configuration and performance when considering a plurality of possible simulation scenarios of future demand, and validate those scenarios against historical demand and current configuration costs.

FIG. 4 illustrates example node data 306 for each node of a plurality of nodes.

In some examples, node data 306 may include, by store identification number (Store ID), attributes for each of a plurality of nodes at a present time or at a specified time frame in the future, such as: current number of packing station(s), store latitude, store longitude, maximum package throughput, demand region, required number of packing stations, packing station cost, present inventory assortment, future inventory assortment, floor space, warehouse space, inventory storage space, or other node attributes.

In some embodiments, maximum package throughput be based on inventory constraints, node space constraints, demand constraints, labor constraints, or other factors. In some examples, the demand region can be configured to encompass all the nodes across a retail enterprise. In other examples, demand region can be configured to encompass specific nodes of a retail enterprise, such as nodes in a particular geographic region or supply chain. In some instances, a required number of packing stations can be based on current or forecasted constraint values within the region or a given node including: budget constraints, labor constraints, space constraints, demand constraints, or other factors. The required packing stations value may be used to set a minimum number of packing stations to be used at a particular location (e.g., to prevent a scenario from being selected that removes a packing station). For simplicity, the required packing stations number in the example is set to zero in all use cases, but this is not necessarily the case in practice.

In some examples, packing station cost may vary across the nodes. In other instances, a required number of packing stations may be left at zero. In some embodiments, packing station cost may vary based on the current number of packing stations, space constraints, labor constraints, packing station type, demand constraints, or other internal or external factors. For example, a packing station cost may be set to zero for individual entries of node data that include at least an existing number of packing stations available at a particular node location. For other scenarios represented by other lines of data reflected in the node data 306, the cost may correspond to a cost of adding further packing stations and/or additional labor inputs to service the additional capacity provided by those packing stations, with the benefit corresponding to the "Maximum Package Throughput" represented by greater numbers of packing stations. In other words, although the numbers illustrated in FIG. 4 are entirely hypothetical, in a real-world use case, an increase in the number of packing stations may correspond with an increase in maximum package throughput from that particular store. The ability to adjust node data based on current inputs, future inputs, or experimental inputs may have advantages of customizing optimal configurations based on one or more enterprise objectives, thus creating an efficiency because a planning decision can be evaluated or re-evaluated based on shifting constraints.

In the example shown, each data entry (as shown, a line of data) included in the node data 306 represents a possible configuration of a node. That is, there may be multiple entries associated with the same node, but with different configurations for that node. In the example shown, a first node having an ID of "111" has three separate possible configurations represented in the node data, of 3, 4, and 5 pack stations. In this example, because that node currently has 4 pack stations, the packing station cost is zero for the first two scenarios, but is nonzero to add an additional pack station. This additional pack station cost represents costs of installation and operation of that pack station over the modeled time period, and changes the overall maximum demand throughput for that node. In other words, for store "111" in the hypothetical shown, a cost of 100 is applied to move from 4 to 5 pack stations, which increases maximum throughput from 250 units to 350 units. Similar scenarios are illustrated for stores "222" and "333" as well.

In the example shown, a demand region may be assigned to each node location. The demand region may be used to regionalize individual nodes, and allows for easy segmentation of the optimization problem by assigning a particular node to a demand region. That is, the store may be constrained to be among those that satisfy all demand associated with a particular region. In this way, the solver described above may sub-segment an optimization process to perform a plurality of sub-optimization processes (on a per-region basis). In doing so, for large problem spaces (such as the one addressed by the present application which involves all ZIP codes across the United States and thousands of potential supply chain nodes, and therefore possibly tens of thousands of potential node configurations), the entire problem space of analyzing a multifactor problem involving many supply chain configurations fulfilling shipments at each ZIP code from each potential node candidate may be reduced. In the example node data shown, a segmented demand region "NY" is depicted as having (for simplicity) three nodes with a plurality of possible configurations for each node as depicted by the dotted outline in the Figure. In this way, a user may easily define a segmentation of data to be applied at the decision model in a way that comports with expected arrangements of shipping flows. This allows use of the decision model without requiring customized reconfiguration of the decision model, and enables the user to define the ways in which a problem space for the decision model may be reduced to only those likely scenarios that will ultimately be adopted. This has the advantage of providing the user inherent control over problem complexity at the input data side, while reducing overall computing complexity.

In some implementations, fewer than all of the fields included in the node data may be provided for optimization. For example, in some instances a node may or may not be forced to include a predetermined number of pack stations, e.g., where that node is not readily reconfigurable or where it may otherwise be desired for that node to be included in any solution, the node may be forced into the solution by adding a number in the "required" field, which will include that node within the solution even if its configuration is suboptimal. Otherwise, such a field might be excluded from the node data. A particular node may be forced into a solution based on (by way of example) a requirement that the node is able to handle bulky or special-purpose items; otherwise, the node may be forced out of a solution by exclusion from the node data.

Figure 5:
FIG. 5 illustrates example forecasted demand data for each of a plurality of regions.

FIG. 5 illustrates example forecasted demand data 308 for each of a plurality of regions.

In some examples, demand data 308 may include, by demand location, a demand latitude, a demand longitude, or a forecasted demand. In some embodiments, the demand latitude and the demand longitude may be the centroid of a region. For example, the centroid of a region may correspond with the centroid of a ZIP code, as described with respect to FIG. 1B. In some embodiments, where the demand corresponds to forecasted demand, that forecasted demand for a demand location can be predicted by demand models using forecast information from the internal or external data sources. For example, forecasted demand may be based on one or more factors for one or more sales within a demand location such as: inventory associated with sale, time of sale, shipping destination of sale, sales performance information about demand location(s), other sales information from the enterprise, market conditions, enterprise objectives, or other factors. In some instances, forecast information may be based on historical, present, or predicted information.

FIG. 6 illustrates example output optimized configuration data 600. The optimized configuration data 600 may be generated by the decision model 304, and may be used within the optimal configuration 322 output from the computing system 302, and integrated within visualizations 324 of FIG. 3. The optimized configuration data 600 may represent an overall optimization, or may represent an optimization of one or more segments if the overall problem space is segmented at the decision model 304. In some examples, the optimized configuration data is an aggregation of segmented optimization data generated from a plurality of segmented problem sets.

In the example shown, the optimized configuration data 600 includes an identification of a node, as well as a selected number of packing stations or other equipment that are included in the selected configuration determined to be optimal by the decision model. A store capacity identifies the overall store capacity when optimized. The "DDUs" corresponds to a count of demand regions serviced by the particular node in the optimized configuration (e.g., the number of ZIP codes that are serviced from a particular supply chain node), as well as a minimum distance, maximum distance, and average distance of travel to ship items from the node to the now-associated demand regions (e.g., from the store latitude and longitude to the ZIP code centroid, in a direct-line distance). A total demand attributed to the node in the optimized configuration is also depicted.

In some example embodiments, additional information may be included within the optimized configuration data 600, or may be inferentially drawn into that data from the source data inputs. For example, the optimized configuration data 600 may include cost data associated with each node, e.g., a cost determined to be associated with reconfiguring the node in accordance with the optimized configuration data 600. Other information, such as total cost, may be extrapolated from the shipment distances, total capacity (and related labor/equipment costs), and the like, for purposes of reporting.

Figure 7:
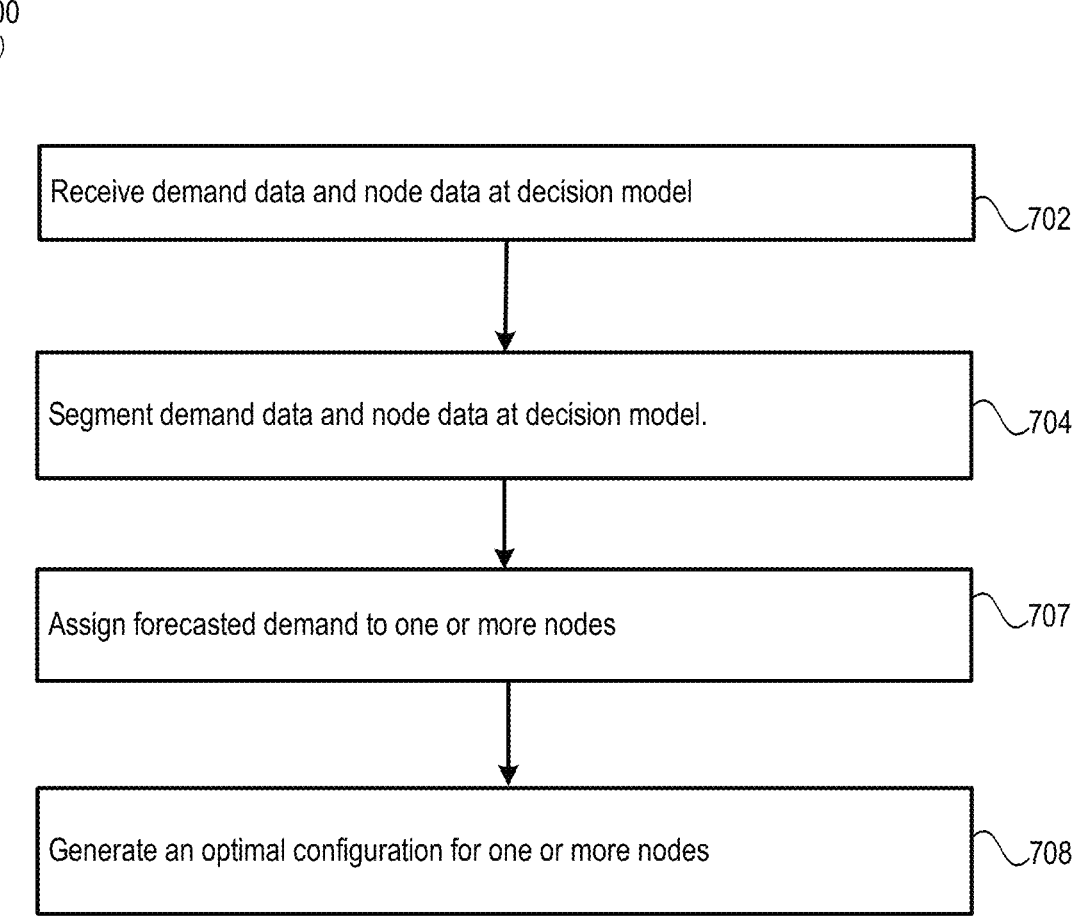
FIG. 7 illustrates an example method of optimizing a ship-from-store process for a retail enterprise.

FIG. 7 illustrates an example method of optimizing a ship-from-store process for a retail enterprise. Method 700 includes operations 702, 704. 706, and 708. The method 700 may be performed by one or more systems of the system 300 with respect to FIG. 3.

Method 700 begins at step 702 with receiving data inputs at a computing system. In some examples, the data inputs may be received from sources internal to the enterprise, external to the enterprise, or both. In some embodiments, the data inputs may include some or all forecasted demand data associated with one or more regions, node data associated with one or more nodes, shipping cost data, store throughput data, store labor data and market segment data. The node data may include, as noted above, a plurality of potential scenarios associated with each of one or more supply chain nodes, reflecting a current configuration and optionally a plurality of other possible configurations of that supply chain node and related costs and capacity values.

The data inputs are provided to a decision model configured to assign forecasted demand to one or more nodes. In some embodiments, the data inputs may be provided to the decision model by a user of the computing system. In other embodiments, the data inputs may be automatically provided to the decision model by the computing system, e.g., based on a scheduled simulation run time.

In some examples, at step 704, the model, or supporting execution software, segments the overall optimization process into a plurality of segmented optimization problems. This may be performed by segmenting the node data into a plurality of segments based on defined segments or regions in which individual nodes and related node configurations are located. Optionally, segmenting may include segmenting the demand data as well, by associating demand data within a particular region with the nodes designated as servicing that region.

In some examples, at step 706 an assignment of forecasted demand to the one or more nodes may be generated by the decision model. In some embodiments, the assignment of forecasted demand to one or more nodes is performed using the optimization model described above, which has a general objective of optimizing a supply chain objective based on the demand data, node data, and shipping cost data. In some examples, the supply chain objective may include minimizing a distance, minimizing a shipping cost, minimizing an equipment cost, or maximizing a throughput rate. In some embodiments, the supply chain objective may be subject to a plurality of constraints including fulfillment of the forecasted demand within a predetermined delivery service level or allocating demand of one or more bulky items to fewer than all nodes of the one or more nodes. In some examples, the plurality of constraints can include fulfillment of the forecasted demand within a predetermined delivery service level or allocating demand of one or more bulky items to fewer than all nodes of the one or more nodes.

In some examples, at step 708 an optimal configuration for the one or more nodes may be generated. In some embodiments, the optimal configuration each node may include one or more of a quantity of equipment, a type of equipment, a quantity of labor, or a type of labor. In some examples, the output data may include an optimized throughput value. In alternative implementations, the supply chain objective may be optimized for one or more scenarios, each scenario including one or more of altered demand data, altered shipping rates, or an alternate throughput rate.

Figure 8:
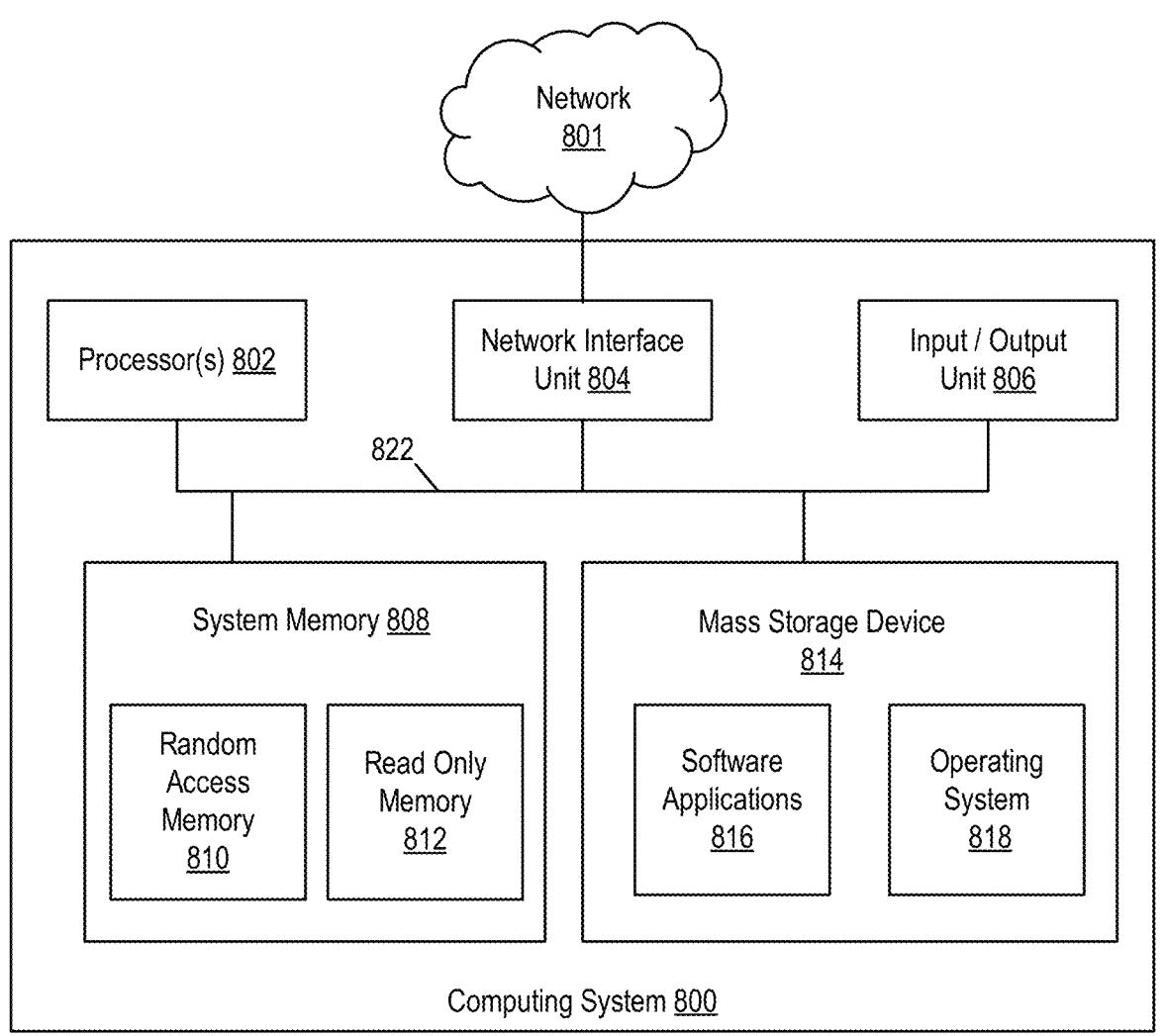
FIG. 8 illustrates an example block diagram of a computing system with which aspects of the present disclosure may be implemented.

FIG. 8 illustrates an example block diagram of a virtual or physical computing system 800. One or more aspects of the computing system 800 can be used to implement the system and processes described herein.

In the embodiment shown, the computing system 800 includes one or more processors 802, a system memory 808, and a system bus 822 that couples the system memory 808 to the one or more processors 802. The system memory 808 includes RAM (Random Access Memory) 810 and ROM (Read-Only Memory) 812. A basic input/output system that contains the basic routines that help to transfer information between elements within the computing system 800, such as during startup, is stored in the ROM 812. The computing system 800 further includes a mass storage device 814. The mass storage device 814 is able to store software instructions and data. The one or more processors 802 can be one or more central processing units or other processors.

The mass storage device 814 is connected to the one or more processors 802 through a mass storage controller (not shown) connected to the system bus 822. The mass storage device 814 and its associated computer-readable data storage media provide non-volatile, non-transitory storage for the computing system 800. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 800.

According to various embodiments of the invention, the computing system 800 may operate in a networked environment using logical connections to remote network devices through the network 801. The network 801 is a computer network, such as an enterprise intranet and/or the Internet. The network 801 can include a LAN, a Wide Area Network (WAN), the Internet, wireless transmission mediums, wired transmission mediums, other networks, and combinations thereof. The computing system 800 may connect to the network 801 through a network interface unit 804 connected to the system bus 822. It should be appreciated that the network interface unit 804 may also be utilized to connect to other types of networks and remote computing systems. The computing system 800 also includes an input/output controller 806 for receiving and processing input from a number of other devices, including a touch user interface display screen, or another type of input device.

Similarly, the input/output controller 806 may provide output to a touch user interface display screen or other type of output device.

As mentioned briefly above, the mass storage device 814 and the RAM 810 of the computing system 800 can store software instructions and data. The software instructions include an operating system 818 suitable for controlling the operation of the computing system 800. The mass storage device 814 and/or the RAM 810 also store software instructions, that when executed by the one or more processors 802, cause one or more of the systems, devices, or components described herein to provide functionality described herein. For example, the mass storage device 814 and/or the RAM 810 can store software instructions that, when executed by the one or more processors 802, cause the computing system 800 to receive and execute managing network access control and build system processes.

Referring to the present disclosure generally, the disclosed computing system provides a physical environment within which aspects of the present disclosure may be implemented. For example the computing system may represent a an environment in which an optimization process may be executed. The computing system may provide inputs and outputs for receiving supply chain data and for receiving configurations from a user and for outputting optimal supply chain configurations and demand allocation. The computing system may also interface with other computing system for executing scenarios.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method of optimizing a ship-from-store process at a decision model implemented on a computing system, the method comprising:

receiving, at the computing system, first data including a forecasted demand for each of a plurality of regions, wherein each region includes one or more zip code and at least one of a plurality of retail store locations within a retail enterprise;

receiving, at the computing system, second data including node data for each of the retail store locations, wherein the node data includes: a physical location, a throughput configuration defining physical packing station equipment currently configured at the node, and one or more constraint value selected from a packing station equipment value corresponding to a limit on number of packing stations to be allocated to a respective node, a limit on number of packages able to be handled at a respective node, one or more type of package able to be handled at a respective node, and a limit on package size able to be handled at a respective node;

receiving, at the computing system, shipping data, the shipping data including a shipping cost associated with delivery of the forecasted demand for each of the plurality of regions from one or more of the plurality of nodes; and providing the first data, the second data, and the shipping data to the decision model, the decision model being configured to execute an optimization process to generate output data, the output data including an assignment of the forecasted demand to one or more nodes among the plurality of nodes based on the shipping cost data and the node data while minimizing one or more of a distance, a shipping cost, and a packing station equipment cost;

wherein the output data defines an optimal configuration for each node of the plurality of nodes, the optimal configuration including one or more of an optimized throughput value corresponding to the forecasted demand to be handled by the node, a quantity of packing station equipment assigned to the node, and a type of packing station equipment assigned to the node.

2. The method of claim 1, wherein the optimization process comprises segmenting the node data into a plurality of segments based on defined regions within an overall geographical region in which each respective node is located.

3. The method of claim 1, wherein the decision model further comprises a mixed-integer linear optimization program configured to identify a minimized value of as defined over a problem space of a set of delivery locations having a demand value assigned thereto, a set of nodes, and a set of possible node configurations.

4. The method of claim 1, wherein the first data and the second data is segmented into a plurality of optimization segments, in which the set of nodes and set of delivery locations are separated into a plurality of regional sets of nodes and delivery locations, wherein the decision model determines an optimal configuration for each of the plurality of optimization segments without requiring analysis of all node to delivery location combinations included in the first data and the second data.

5. The method of claim 1, wherein the second data further includes a packing station cost corresponding to a cost of adding one or more packing stations at the node and a plurality of data entries associated with a node from among the plurality of nodes, the plurality of entries corresponding to different configurations of numbers of packing stations at the node.

6. The method of claim 1, wherein the plurality of regions comprises a plurality of zip codes, and wherein the first data comprises aggregated demand for each zip code.

7. The method of claim 6, wherein the first data includes a plurality of entries, each entry corresponding to a zip code and including aggregated demand for the zip code and a location corresponding to a centroid of the zip code.

8. The method of claim 1, wherein the optimization process further comprises allocating demand of at least one bulky item to fewer than all nodes of the plurality of nodes.

9. The method of claim 1, wherein the optimization process further comprises optimizing a supply chain objective selected from one or more of: minimizing a shipping distance, minimizing a shipping cost, and minimizing a combination of a shipping cost and an equipment cost.

10. The method of claim 1, wherein the output data further comprises two or more of: a total cost to achieve the optimal configuration, an estimated shipping cost total for the optimal configuration, and an estimated shipping cost total for a current configuration.

11. The method of claim 1, further comprising optimizing, using the node data, the supply chain objective subject to a plurality of constraints for a plurality of scenarios, each of the scenarios including one or more of an altered demand, an altered shipping rate, or an altered throughput rate.

12. A system for automatically determining ship-from-store equipment configurations in a distributed enterprise supply chain, the system comprising:
- a computing system comprising a processor and a memory, the memory storing instructions which, when executed by the computing system, cause the system to perform:
  - receiving first data from a first data source including a forecasted demand for each of a plurality of regions, wherein each region includes one or more zip code and at least one of a plurality of retail store locations within a retail enterprise;
  - receiving second data from a second data source, the second data source including node data for each of the retail store locations, wherein the node data includes: a physical location, a throughput configuration defining physical packing station equipment currently configured at the node, and one or more constraint value selected from a packing station equipment value corresponding to a limit on number of packing stations to be allocated to a respective node, a limit on number of packages able to be handled at a respective node, one or more type of package able to be handled at a respective node, and a limit on package size able to be handled at a respective node;
  - receiving shipping cost data from a shipping cost management system, the shipping data including a shipping cost associated with delivery of the forecasted demand for each of the plurality of regions from one or more of the plurality of nodes; and
  - providing the first data, the second data, and the shipping data to the decision model, the decision model being configured to execute an optimization process to generate output data, the output data including an assignment of the forecasted demand to one or more nodes among the plurality of nodes based on the shipping data and the node data while minimizing one or more of a distance, a shipping cost, and a packing station equipment cost;
wherein the output data defines an optimal configuration for each node of the plurality of nodes, the optimal configuration including one or more of an optimized throughput value corresponding to the forecasted demand to be handled by the node, a quantity of packing station equipment assigned to the node, and a type of packing station equipment assigned to the node.

13. The system of claim 12, wherein the optimization process comprises segmenting the node data into a plurality of segments based on defined regions within an overall geographical region in which each respective node is located.

14. The system of claim 12, wherein the wherein the decision model further comprises a mixed-integer linear optimization program configured to identify a minimized value of as defined over a problem space of a set of delivery locations having a demand value assigned thereto, a set of nodes, and a set of possible node configurations.

15. The system of claim 12, further comprising optimizing, using the node data, the supply chain objective subject to a plurality of constraints for a plurality of scenarios, each of the scenarios including one or more of an altered demand, an altered shipping rate, or an altered throughput rate.

16. The system of claim 12, wherein the plurality of regions comprises a plurality of zip codes, and wherein the first data comprises aggregated demand for each zip code; and
wherein the first data includes a plurality of entries, each entry corresponding to a zip code and including aggregated demand for the zip code and a location corresponding to a centroid of the zip code.

17. The system of claim 12, wherein the first data and the second data is segmented into a plurality of optimization segments, in which the set of nodes and set of delivery locations are separated into a plurality of regional sets of nodes and delivery locations, wherein the decision model determines an optimal configuration for each of the plurality of optimization segments without requiring analysis of all node to delivery location combinations included in the first data and the second data.

18. The system of claim 12, wherein the output data further comprises two or more of: a total cost to achieve the optimal configuration, an estimated shipping cost total for the optimal configuration, and an estimated shipping cost total for a current configuration.

19. The system of claim 12, wherein the optimization process further comprises optimizing a supply chain objective selected from one or more of: minimizing a shipping distance, minimizing a shipping cost, and minimizing a combination of a shipping cost and an equipment cost.

20. A method of optimizing a ship-from-store process at a decision model implemented on a computing system, the method comprising:
- receiving, at the computing system, first data including a forecasted demand for each of a plurality of regions, wherein each region includes one or more zip code and at least one of a plurality of retail store locations within a retail enterprise;
- receiving, at the computing system, second data including node data, for each of the retail store locations, wherein the node data includes: a physical location, a throughput configuration defining physical packing station equipment currently configured at the node, and one or more constraint value selected from a packing station equipment value corresponding to a limit on number of packing stations to be allocated to a respective node, a limit on number of packages able to be handled at a respective node, one or more type of package able to be handled at a respective node, and a limit on package size able to be handled at a respective node;

receiving, at the computing system, shipping data, the shipping data including a shipping cost associated with delivery of the forecasted demand for each of the plurality of regions from one or more of the plurality of nodes;

segmenting the node data into a plurality of geographical segments; and providing the first data, the second data, and the shipping data to the decision model, the decision model being configured to, for each segment of the plurality of geographical segments, execute an optimization process to generate output data, the output data including an assignment of the forecasted demand to one or more nodes among the plurality of nodes based on the shipping data and the node data while minimizing one or more of a distance, a shipping cost, and a packing station equipment cost;

wherein the output data defines an optimal configuration for each node of the plurality of nodes across the plurality of geographical segments, the optimal configuration including one or more of an optimized throughput value corresponding to the forecasted demand to be handled by the node, a quantity of packing station equipment assigned to the node, and a type of packing station equipment assigned to the node.

* * * * *